United States Patent
Zhang et al.

(10) Patent No.: US 11,163,499 B2
(45) Date of Patent: Nov. 2, 2021

(54) METHOD, APPARATUS AND SYSTEM FOR CONTROLLING MOUNTING OF FILE SYSTEM

(71) Applicant: Beijing Baidu Netcom Science and Technology Co., Ltd., Beijing (CN)

(72) Inventors: Hongzhou Zhang, Beijing (CN); Yongqiang Yang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 43 days.

(21) Appl. No.: 16/566,567

(22) Filed: Sep. 10, 2019

(65) Prior Publication Data
US 2020/0004427 A1    Jan. 2, 2020

(30) Foreign Application Priority Data
Nov. 21, 2018 (CN) .......................... 201811391921.X (51) Int. Cl.
*G06F 3/06* (2006.01)
*G06F 9/50* (2006.01)
*G06F 11/14* (2006.01)

(52) U.S. Cl.
CPC .............. *G06F 3/067* (2013.01); *G06F 3/064* (2013.01); *G06F 3/0622* (2013.01); *G06F 9/5083* (2013.01); *G06F 11/1479* (2013.01)

(58) Field of Classification Search
CPC .......... G06F 3/67; G06F 3/0622; G06F 3/064; G06F 9/064; G06F 11/1479
USPC .......................................................... 711/154
See application file for complete search history.

(56) References Cited

U.S. PATENT DOCUMENTS

| | | | |
|---|---|---|---|
| 10,509,914 B1* | 12/2019 | Desai | G06F 21/604 |
| 2002/0138696 A1* | 9/2002 | Kodama | H04L 67/1034 |
| | | | 711/114 |
| 2003/0078944 A1* | 4/2003 | Yamauchi | H04L 67/06 |
| 2004/0078466 A1* | 4/2004 | Coates | H04L 67/1002 |
| | | | 709/226 |
| 2004/0133634 A1* | 7/2004 | Luke | H04L 49/357 |
| | | | 709/203 |
| 2005/0027862 A1* | 2/2005 | Nguyen | H04L 63/0428 |
| | | | 709/225 |
| 2007/0079062 A1* | 4/2007 | Miyawaki | G06F 3/0632 |
| | | | 711/112 |

FOREIGN PATENT DOCUMENTS

CN    107172061 A    9/2017

\* cited by examiner

*Primary Examiner* — Gautam Sain
(74) *Attorney, Agent, or Firm* — Kilpatrick Townsend & Stockton LLP (57) ABSTRACT

Embodiments of the present disclosure disclose a method, apparatus and system for controlling mounting of a file system. A specific embodiment of the method includes: receiving network attribute information of a target client sent by a target server as first network attribute information; determining, based on the first network attribute information, whether the target client has permission to mount to a target file system; and sending, in response to determining that the target client has permission to mount to the target file system, an identification of the target file system to the target server.

10 Claims, 7 Drawing Sheets

METHOD, APPARATUS AND SYSTEM FOR CONTROLLING MOUNTING OF FILE SYSTEM

CROSS-REFERENCE TO RELATED APPLICATIONS

This application claims priority to Chinese Application No. 201811391921.X, filed on Nov. 21, 2018 and entitled "Method, Apparatus And System For Controlling Mounting Of File System," the entire disclosure of which is hereby incorporated by reference.

TECHNICAL FIELD

Embodiments of the present disclosure relate to the field of computer technology, and specifically to a method, apparatus and system for controlling mounting of a file system.

BACKGROUND

With the development of computer technology, in view of performance, capacity, reliability and other aspects, most of Internet services are generally built on distributed systems, providing services through one or more clustered servers.

Generally, the related method is to specify a file system that the server supports to mount and the mounting approach thereof by configuring a configuration file of a specified server.

SUMMARY

Embodiments of the present disclosure propose a method, apparatus and system for controlling mounting of a file system.

In a first aspect, some embodiments of the present disclosure provide a method for controlling mounting of a file system, including: receiving network attribute information of a target client sent by a target server as first network attribute information; determining, based on the first network attribute information, whether the target client has permission to mount to a target file system; and sending, in response to determining that the target client has permission to mount to the target file system, an identification of the target file system to the target server.

In some embodiments, the determining, based on the first network attribute information, whether the target client has permission to mount to a target file system, includes: generating first mount point information based on the first network attribute information; determining whether verification information in a verification information set matches the first mount point information; and determining, in response to determining the verification information in the verification information set matching the first mount point information, that the target client has permission to mount to the target file system.

In some embodiments, before the receiving network attribute information of a target client sent by a target server as first network attribute information, the method further includes: acquiring, in response to receiving a file system application request sent by a client, network attribute information of the client as second network attribute information; generating, based on the second network attribute information, second mount point information and an identification of a file system corresponding to the second mount point information; generating verification information based on the second network attribute information, the second mount point information, and the identification of the file system corresponding to the second mount point information; storing the verification information into the verification information set; and sending the second mount point information and the identification of the file system corresponding to the second mount point information to the client.

In some embodiments, the first network attribute information includes an authentication string after encryption; and the determining, based on the first network attribute information, whether the target client has permission to mount to a target file system, includes: generating a verification string using a decryption algorithm corresponding to the encryption; and determining, in response to determining that the verification string matches the authentication string, that the target client has permission to mount to the target file system.

In some embodiments, the method further includes: sending, in response to determining that the target client does not have permission to mount to the target file system, error prompt information to the target server.

In a second aspect, some embodiments of the present disclosure provide an apparatus for controlling mounting of a file system, including: a first receiving unit, configured to receive network attribute information of a target client sent by a target server as first network attribute information; a determining unit, configured to determine, based on the first network attribute information, whether the target client has permission to mount to a target file system; and a first sending unit, configured to send, in response to determining that the target client has permission to mount to the target file system, an identification of the target file system to the target server.

In some embodiments, the determining unit includes: a first generation module, configured to generate first mount point information based on the first network attribute information; a first determining module, configured to determine whether verification information in a verification information set matches the first mount point information; and a second determining module, configured to determine, in response to determining the verification information in the verification information set matching the first mount point information, that the target client has permission to mount to the target file system.

In some embodiments, the apparatus further includes: an acquisition unit, configured to acquire, in response to receiving a file system application request sent by a client, network attribute information of the client as second network attribute information; a first generation unit, configured to generate, based on the second network attribute information, second mount point information and an identification of a file system corresponding to the second mount point information; a second generation unit, configured to generate verification information based on the second network attribute information, the second mount point information, and the identification of the file system corresponding to the second mount point information; a storing unit, configured to store the verification information into the verification information set; and a second sending unit, configured to send the second mount point information and the identification of the file system corresponding to the second mount point information to the client.

In some embodiments, the first network attribute information includes an authentication string after encryption; and the determining unit includes: a second generation module, configured to generate a verification string using a decryption algorithm corresponding to the encryption; and a third determining module, configured to determine, in response to determining that the verification string matches the authentication string, that the target client has permission to mount to the target file system.

In some embodiments, the apparatus further includes: a third sending unit, configured to send, in response to determining that the target client does not have permission to mount to the target file system, error prompt information to the target server.

In a third aspect, some embodiments of the present disclosure provide a system for controlling mounting of a file system, including: a load balancer, configured to receive a mount request sent by a target client; determine, based on a load condition of a server in a server cluster, a target server from the server cluster; and send the mount request to the target server; the target server, configured to acquire network attribute information of the target client in response to receiving the mount request; and send the network attribute information of the target client to an authorization server; and the authorization server, configured to receive the network attribute information of the target client as first network attribute information; determine, based on the first network attribute information, whether the target client has permission to mount to a target file system; and send, in response to determining that the target client has permission to mount to the target file system, an identification of the target file system to the target server.

In some embodiments, the authorization server is further configured to: acquire, in response to receiving a file system application request sent by a client, network attribute information of the client as second network attribute information; generate, based on the second network attribute information, second mount point information and an identification of a file system corresponding to the second mount point information; generate verification information based on the second network attribute information, the second mount point information, and the identification of the file system corresponding to the second mount point information; store the verification information into a verification information set; and send the second mount point information and the identification of the file system corresponding to the second mount point information to the client.

In some embodiments, the target server is further configured to: send information indicating a successful mount to the target client, in response to receiving the identification of the target file system.

In some embodiments, the load balancer is further configured to: perform survival detection on a server in the server cluster, in response to receiving a reconnection request sent by the target client, to obtain a survival detection result; determine a new target server from the server cluster based on the survival detection result; and forward the mount request to the new target server.

In a fourth aspect, some embodiments of the present disclosure provide a server, including: one or more processors; and a storage apparatus, storing one or more programs thereon, the one or more programs, when executed by the one or more processors, cause the one or more processors to implement the method according to any one of the implementations in the first aspect.

In a fifth aspect, some embodiments of the present disclosure provide a computer readable medium, storing a computer program thereon, the program, when executed by a processor, implements the method according to any one of the implementations in the first aspect.

The method, apparatus and system for controlling mounting of a file system provided by some embodiments of the present disclosure, first, receive network attribute information of a target client sent by a target server as first network attribute information; then determine, based on the first network attribute information, whether the target client has permission to mount to a target file system; and send, in response to determining that the target client has permission to mount to the target file system, an identification of the target file system to the target server, thereby implementing the control on whether the target client is allowed to be mounted to the target file system by using the received network attribute information of the target client.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
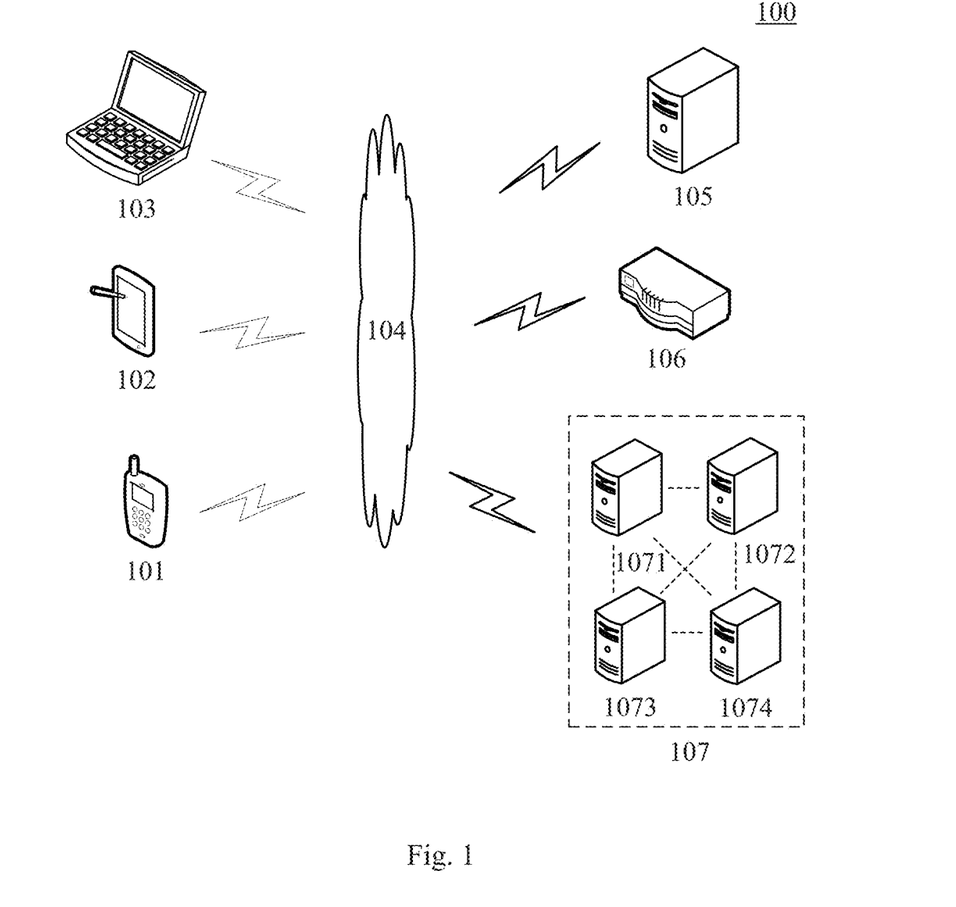
FIG. 1 is a diagram of an example system architecture in which an embodiment of the present disclosure may be implemented.

FIG. 1 illustrates an example system architecture 100 in which a method for controlling mounting of a file system or an apparatus for controlling mounting of a file system according to an embodiment of the present disclosure may be implemented.

As shown in FIG. 1, the system architecture 100 may include terminal devices 101, 102, 103, a network 104, a server 105, a load balancer 106, and a server cluster 107. The server cluster 107 may include servers 1071, 1072, 1073, and 1074. The network 104 serves as a medium providing a communication link between the terminal devices 101, 102, 103, the server 105, the load balancer 106, and the server cluster 107. The network 104 may include various types of connections, such as wired or wireless communication links, or optic fibers.

A user may interact with the server 105, the load balancer 106, and the servers 1071, 1072, 1073, 1074 in the server cluster 107 via the network 104 using the terminal device 101, 102 or 103, to receive or transmit messages or the like. Various communication client applications, such as web browser applications, search applications, instant communication tools, mailbox clients, social platform software, text editing applications, and reading applications, may be installed on the terminal devices 101, 102, and 103.

The terminal devices 101, 102, 103 may be hardware or software. When the terminal devices 101, 102, 103 are hardware, the terminal devices 101, 102, 103 may be various electronic devices having display screens and supporting file sharing, including but not limited to smart phones, tablets, e-book readers, laptop portable computers, and desktop computers, or the like. When the terminal devices 101, 102, 103 are software, the terminal devices 101, 102, 103 may be installed in the above-listed electronic devices. The terminal devices 101, 102, 103 may be implemented as a plurality of software or software modules (for example, for providing distributed services) or as a single software or software module, which is not specifically limited herein.

The server 105 may be a server that provides various services, such as an authorization server that authenticates when an application (Application, APP) on the terminal devices 101, 102, 103 accesses the file system. The authorization server may process such as authenticate a client corresponding to a mount request; and send authorization information to a target server in the server cluster 107 based on an authorization result.

The load balancer 106 may be a device capable of load balancing using various load balancing algorithms. For example, a server that is lightly loaded (e.g., the server 1072) may be determined from the server cluster 107 as the load balancer of the target server.

It should be noted that the server 105 and the servers in the server cluster 107 may be hardware or software. When the server 105 is hardware, the server 105 may be implemented as a distributed server cluster composed of a plurality of servers, or may be implemented as a single server. The server cluster 107 is generally a distributed server cluster composed of a plurality of servers. When the server 105 and the servers in the server cluster 107 are software, the server 105 and the servers in the server cluster 107 may be implemented as a plurality of software or software modules (for example, for providing distributed services) or as a single software or software module. The load balancer 106 may be hardware or software. When the load balancer 106 is hardware, the load balancer may be implemented as a distributed device cluster composed of a plurality of load balancers, or may be implemented as a single device. When the load balancer 106 is software, the load balancer may be installed in the load balancers listed above, and may be implemented as a plurality of software or software modules (for example, for providing distributed services) or as a single software or software module, which is not specifically limited herein.

It should be noted that the method for controlling mounting of a file system provided by some embodiments of the present disclosure is generally performed by the server 105, accordingly, the apparatus for controlling mounting of a file system is generally disposed in the server 105.

It should be understood that the number of terminal devices, networks, servers, load balancers and server clusters in FIG. 1 is merely illustrative. Depending on the implementation needs, there may be any number of terminal devices, networks, servers, load balancers and server clusters.

Figure 2:
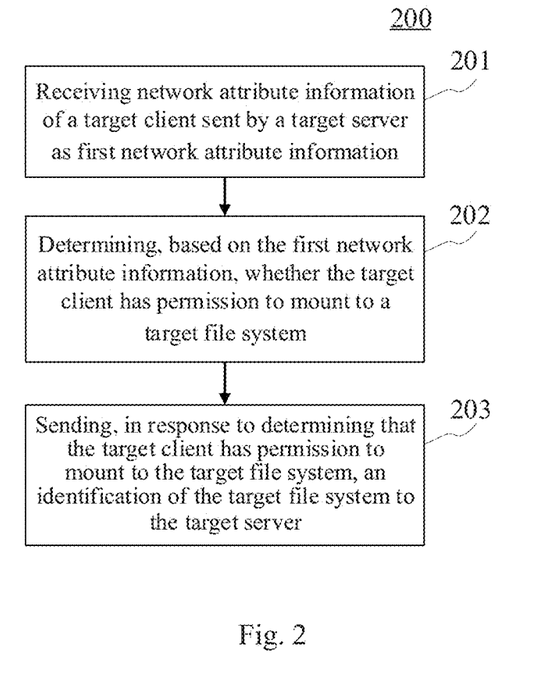
FIG. 2 is a flowchart of a method for controlling mounting of a file system according to an embodiment of the present disclosure.

With further reference to FIG. 2, a flow 200 of a method for controlling mounting of a file system according to an embodiment of the present disclosure is illustrated. The method for controlling mounting of a file system includes the following steps.

Step 201, receiving network attribute information of a target client sent by a target server as first network attribute information.

In the present embodiment, an executing body of the method for controlling mounting of a file system (for example, the server 105 shown in FIG. 1) may receive the network attribute information of the target client (for example, the terminal device 101 shown in FIG. 1) sent by the target server (for example, the server 1072 in the server cluster 107 shown in FIG. 1) as the first network attribute information through a wired or wireless connection. The file system generally refers to an approach used by an operating system to organize and manage data stored on physical media. The file system may be a distributed file system in which a physical storage resource managed by the file system is connected to a node through a computer network but is not limited to be directly connected to a local node. The file system may include, but is not limited to, at least one of: NFS (Network File System), AFS (Andrew File System), or KFS (KASS File System). In practice, the file system may also be a cloud storage system that integrates a large number of different types of storage devices in the network through application software to work together and jointly provide data storage and service access functions for others. It should be noted that for access requirements of the client on different networks, the file system may separately generate access addresses corresponding to the networks. Each of the access addresses may be referred to as a mount point. The mounting of the file system may mean that the client accesses the file system locally through the domain name of a specified mount point. It may be understood that the controlling mounting of a file system may be implemented as controlling whether the client can access a server storing various forms of data (for example, the server in the server cluster 107 shown in FIG. 1).

In the present embodiment, the target server may be any pre-specified server in the server cluster (for example, the server cluster 107 shown in FIG. 1) according to actual application requirements, or may also be a server preset according to a rule. The rule may be in the order of the indexes of the servers in the server cluster. The target client may be any client pre-specified according to actual application requirements, or may also be a client that meets a preset condition. The preset condition may be, for example, that an IP (Internet Protocol) address of the client is within a preset address range.

In the present embodiment, the network attribute information may be used to represent information that is possessed by the client and has identity in the network. The network attribute information may include, but is not limited to, at least one of: a private key of the client in the network, or a public key of the client in the network. The network may be a VPC (Virtual Private Cloud).

In some alternative implementations of the present embodiment, the network attribute information may further include, but is not limited to, at least one of: the identification (ID) of the network, the name of a to-be-created file system, the identification of the network to which a to-becreated file system instance belongs, the type of the file system, and the protocol type. In an application scenario where the network is a VPC, correspondingly, the identification of the network may be various strings for uniquely identifying the network. The name of the to-be-created file system may be various strings for uniquely identifying the to-be-created file system in the VPC. The identification of the VPC to which the to-be-created file system instance belongs may be various strings for uniquely identifying the VPC to which the to-be-created file system instance belongs, which may be recorded in an instance list for managing the VPC. The type of file system may include, but is not limited to, at least one of: capacity type, or performance type. The protocol type may include, but is not limited to, at least one of: an NFS protocol, or an SMB (Server Message Block) protocol.

In some alternative implementations of the present embodiment, the target server may also be a server determined by the load balancer, in response to receiving a mount request sent by the target client, based on the load condition of the server in the server cluster. As an example, the target server may be the least loaded server in the server cluster. As another example, the target server may also be any server in the server cluster that has a load less than a preset threshold.

Step 202, determining, based on the first network attribute information, whether the target client has permission to mount to a target file system.

In the present embodiment, the target file system may be any file system pre-specified according to actual application requirements, or may be a file system according to a rule. For example, the target file system may also be a file system having a file system identification within a preset range. The executing body may determine, based on the first network attribute information, whether the target client has permission to mount to the target file system in various methods. For example, the executing body may determine whether the target client has permission to mount to the target file system according to the following steps.

In the first step, acquiring a preset authorization information set.

In the present embodiment, the executing body acquires the preset authorization information set locally or from a server in communication connection therewith. The authorization information set includes network attribute information of a client having permission to mount to the target file system.

In the second step, determining whether authorization information in the preset authorization information set matches the first network attribute information.

In the present embodiment, the executing body may search the preset authorization information set, and determine whether the authorization information matches the first network attribute information received in step 201. As an example, the first network attribute information may include a private key. If there is authorization information recorded with information same as the private key in the authorization information set, the matching is determined. As another example, the first network attribute information may include a private key. If there is authorization information recorded with a public key corresponding to the private key in the authorization information set, it is determined that the private key matches the authorization information recorded with the corresponding public key. It may be understood that, since the public key and the private key are in one-to-one correspondence, the matching means that the target client corresponding to the public key and the target client corresponding to the private key are consistent.

In the third step, in response to determining the authorization information in the preset authorization information set matching the first network attribute information, determining that the target client has permission to mount to the target file system.

In the fourth step, in response to determining the authorization information in the preset authorization information set not matching the first network attribute information, determining that the target client does not have permission to mount to the target file system.

In the present embodiment, the executing body may determine whether the target client has permission to mount to the target file system by using the determination result of the second step.

In some alternative implementations of the present embodiment, the executing body may also determine whether the target client has permission to mount to the target file system according to the following steps.

In the first step, generating first mount point information based on the first network attribute information.

In these implementations, the executing body may generate the first mount point information by using various methods based on the first network attribute information acquired in step 201. The mount point may be a directory in the file system. The mount point information may be information for uniquely identifying the mount point, such as the name or identification of the mount point composed of different characters. For example, the first network attribute information may be the identification "VPC-01" of the VPC. The executing body may select a directory located in the VPC network as a first mount point according to "VPC-01". The selection method may be random selection, or may be selected in a preset order. It should be noted that, generally, the first network attribute information is in one-to-one correspondence with the generated first mount point information.

Figure 4:
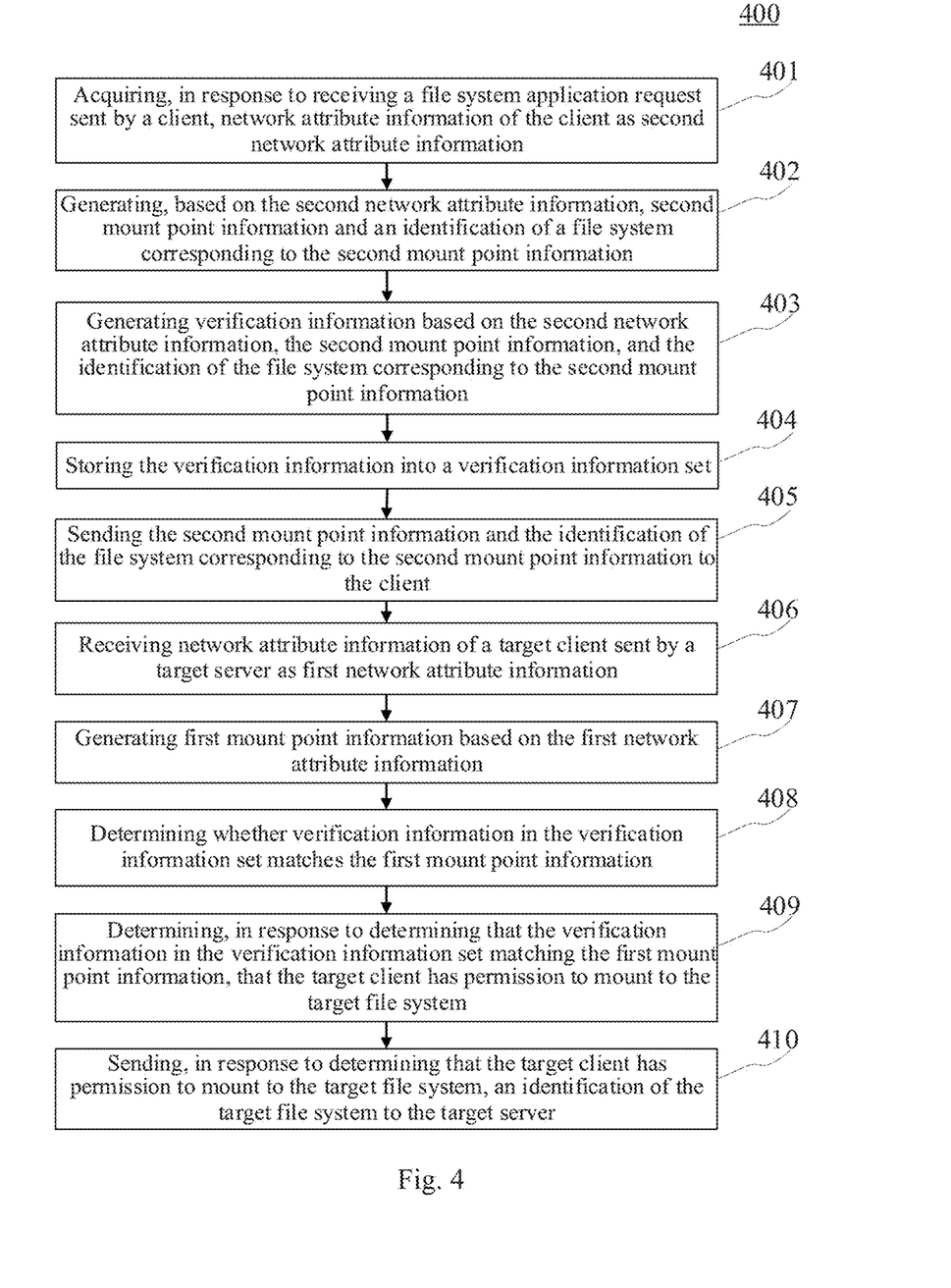
FIG. 4 is a flowchart of the method for controlling mounting of a file system according to another embodiment of the present disclosure.

In these implementations, the executing body may generate the first mount point information corresponding to the first network attribute information using the same method as the step 402 based on the first network attribute information received in step 406.

In the second step, determining whether verification information in a verification information set matches the first mount point information.

In these implementations, the executing body may determine whether the verification information in the verification information set matches the first mount point information. The verification information set may be a preset set. For example, the verification information in the preset verification information set may include a public key, a private key, and mount point information. The above matching may be that the public key, the private key, and the mount point information included in the verification information are the same as the received public key, private key, and the first mount point information, respectively.

In the third step, determining, in response to determining the verification information in the verification information set matching the first mount point information, that the target client has permission to mount to the target file system.

In these implementations, in response to determining the verification information in the verification information set matching the first mount point information, the executing body may determine that the target client has permission to mount to the target file system. The target file system may be a file system corresponding to the identification of the file system included in the verification information that matches the first mount point information in the verification information set.

In some alternative implementations of the present embodiment, the first network attribute information may include an authentication string after encryption. The executing body may also first generate a verification string using a decryption algorithm corresponding to the encryption method; then determine whether the generated verification string is the same as the received authentication string; and finally, in response to determining the generated verification string matching the received authentication string, that the target client has permission to mount to the target file system.

In these implementations, the encryption method may be a method of encrypting using various asymmetric encryption algorithms. The asymmetric encryption algorithm may include but is not limited to at least one of: an RSA encryption algorithm, an Elgamal algorithm (an encryption algorithm based on a Diffie-Hellman key exchange algorithm), a knapsack algorithm, an ECC (Elliptic curve cryptography) algorithm, or the like. It should be noted that the above encryption method and the decryption method corresponding to the encryption method are well-known technologies widely studied and applied at present, and detailed description thereof will be omitted.

Step 203, sending, in response to determining that the target client has permission to mount to the target file system, an identification of the target file system to the target server.

In the present embodiment, the executing body may send, in response to determining in step 202 that the target client has permission to mount to the target file system, the identification of the target file system to the target server through a wired or wireless connection. It may be understood that after the target server receives the identification of the target file system, the target client can access the target file system corresponding to the identification locally by accessing the target server. That is, the executing body sends the identification of the target file system to the target server, which means that the target client is allowed to mount to the target file system through the target server.

In some alternative implementations of the present embodiment, the executing body may further send, in response to determining that the target client does not have permission to mount to the target file system, error prompt information to the target server. The error prompt information may be in various forms. For example, it may be a text "failed to mount" or a string used to characterize the error type.

Figure 3:
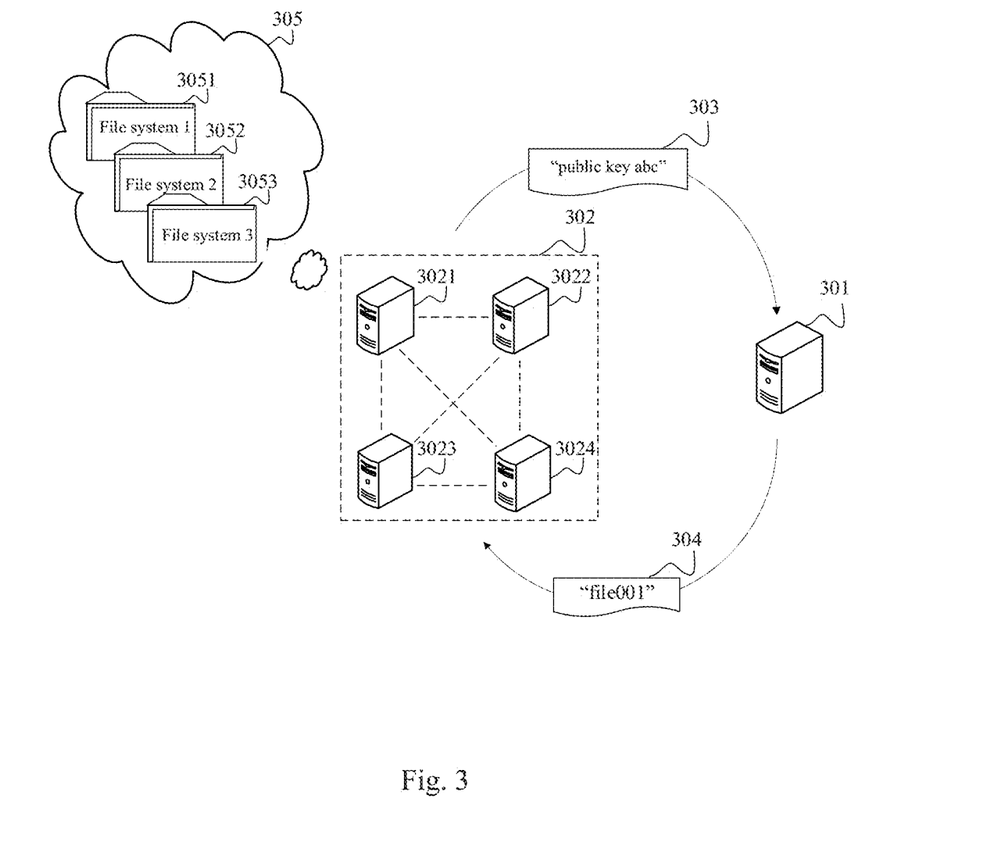
FIG. 3 is a schematic diagram of an application scenario of the method for controlling mounting of a file system according to some embodiments of the present disclosure.

With further reference to FIG. 3, FIG. 3 is a schematic diagram 300 of an application scenario of the method for controlling mounting of a file system according to some embodiments of the present disclosure. In the application scenario of FIG. 3, an authorization server 301 first receives network attribute information 303 of a target client sent by a target server 3022 in a server cluster 302, including the content "public key abc", and defines the network attribute information 303 of the target client as first network attribute information. Then, based on the network attribute information 303 of the target client, the authorization server 301 determines that the target client has permission to mount to a file system 1 3051 in a file system set 305, based on the authorization information "public key abc, file system 1, file001" in an authorization information set matching the "public key abc". Then, the authorization server 301 sends the identification "file001" 304 of the target file system to the target server 3022.

The method for controlling mounting of a file system provided by the above embodiment of the present disclosure, first, receives network attribute information of a target client sent by a target server as first network attribute information; then determines, based on the first network attribute information, whether the target client has permission to mount to a target file system; and sends, in response to determining that the target client has permission to mount to the target file system, an identification of the target file system to the target server. Therefore, after the target server receives the identification of the target file system, the target client can access the target file system locally by accessing the target server, thereby implementing the control on whether the target client is allowed to be mounted to the target file system through the target server by using the received network attribute information of the target client.

With further reference to FIG. 4, a flow 400 of another embodiment of the method for controlling mounting of a file system is illustrated. The flow 400 of the method for controlling mounting of a file system includes the following steps.

Step 401, acquiring, in response to receiving a file system application request sent by a client, network attribute information of the client as second network attribute information.

In the present embodiment, an executing body of the method for controlling mounting of a file system (for example, the server 105 shown in FIG. 1) may acquire, in response to receiving the file system application request sent by the client, the network attribute information of the client locally or from the client as the second network attribute information. The file system application request may be a message sent by the client for applying for the file system. The file system is usually in the network where the client is located. The file system may be represented by the identification of the file system. The identification and the network attribute information may be consistent with the description of step 201 in the foregoing embodiment. In an application scenario where the network is a VPC, the network attribute information may typically include a private key, a public key, and the identification of the VPC, of the client in the network.

Step 402, generating, based on the second network attribute information, second mount point information and an identification of a file system corresponding to the second mount point information.

In the present embodiment, the executing body may generate, based on the second network attribute information acquired in step 401, the second mount point information and the identification of the file system corresponding to the second mount point information. The mount point may be a directory in the file system. The mount point information may be information for uniquely identifying the mount point, such as the name or identification of the mount point composed of different characters. For example, the second network attribute information may be the identification "VPC-01" of the VPC, the public key "abc", or the private key "123". The executing body may generate an identification of a file system, for example, "file01-abc", based on "VPC-01" and the public key "abc". The method for generating the second mount point information based on the second network attribute information by the executing body may be consistent with the alternative implementation in step 202 of the foregoing embodiment, and detailed description thereof will be omitted. It should be noted that, generally, the second network attribute information is in one-to-one correspondence with the generated second mount point information and the identification of the file system.

Step 403, generating verification information based on the second network attribute information, the second mount point information, and the identification of the file system corresponding to the second mount point information.

In the present embodiment, the executing body may combine the second network attribute information acquired in step 401, the second mount point information generated in step 402, and the identification of the file system corresponding to the second mount point information to generate a piece of verification information.

Step 404, storing the verification information into a verification information set.

In the present embodiment, the executing body may store the verification information generated in step 403 into the verification information set. The verification information set is global. The verification information set may include pre-set verification information. In practice, the verification information included in the set may be updated by the storing operation of the executing body.

Step 405, sending the second mount point information and the identification of the file system corresponding to the second mount point information to the client.

In the present embodiment, the executing body may send the second mount point information and the identification of the file system corresponding to the second mount point information generated in step 402 to the client through a wired or wireless connection.

It should be noted that the above step 405 may be performed before step 403, or may be performed substantially in parallel with step 403 or step 404, which is not limited herein.

Step 406, receiving network attribute information of a target client sent by a target server as first network attribute information.

In the present embodiment, the target client may be a client that has applied for the identification of the file system and the mount point information.

Step 407, generating first mount point information based on the first network attribute information.

In the present embodiment, the executing body may generate the first mount point information corresponding to the first network attribute information using the same method as the step 402 based on the first network attribute information received in step 406.

Step 408, determining whether verification information in the verification information set matches the first mount point information.

Step 409, determining, in response to determining that the verification information in the verification information set matching the first mount point information, that the target client has permission to mount to the target file system.

It should be noted that the steps 408 and 409 are respectively consistent with the alternative implementations in step 202 of the foregoing embodiment, and the description of the alternative implementations in step 202 are also applicable to steps 408 and 409, and detailed description thereof will be omitted.

Step 410, sending, in response to determining that the target client has permission to mount to the target file system, an identification of the target file system to the target server.

It should be noted that the steps 406 and 410 are respectively consistent with the alternative implementations in step 201 and step 203 of the foregoing embodiment, and the descriptions for step 201 and 203 are also applicable to steps 406 and 410, and detailed description thereof will be omitted.

As can be seen from FIG. 4, compared with the embodiment corresponding to FIG. 2, the flow 400 of the method for controlling mounting of a file system in the present embodiment reflects the step of generating the mount point information and the identification of the file system corresponding to the mount point information, and refines the step of determining whether the target client has permission to mount to the target file system based on the first network attribute information. Therefore, the solution described in the present embodiment may update the verification information set by using the pre-generated mount point information, and then determine whether the target client has permission to mount to the target file system by matching the verification information set with the first mount point information, thereby enriching the method for controlling mounting of a file system.

Figure 5:
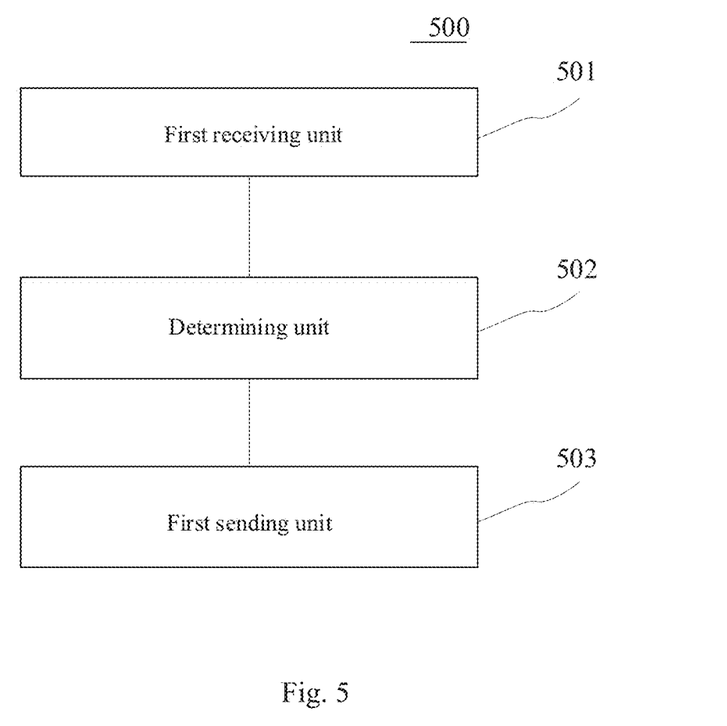
FIG. 5 is a schematic structural diagram of an apparatus for controlling mounting of a file system according to an embodiment of the present disclosure.

With further reference to FIG. 5, as an implementation of the method shown in the above figures, some embodiments of the present disclosure provide an apparatus for controlling mounting of a file system. The apparatus embodiment may correspond to the method embodiment as shown in FIG. 2, and the apparatus may be specifically applied to various electronic devices.

As shown in FIG. 5, an apparatus 500 for controlling mounting of a file system provided by the present embodiment includes: a first receiving unit 501, a determining unit 502 and a first sending unit 503. The first receiving unit 501 is configured to receive network attribute information of a target client sent by a target server as first network attribute information. The determining unit 502 is configured to determine, based on the first network attribute information, whether the target client has permission to mount to a target file system. The first sending unit 503 is configured to send, in response to determining that the target client has permission to mount to the target file system, an identification of the target file system to the target server.

In the present embodiment, the specific processing and the technical effects thereof of the first receiving unit 501, the determining unit 502, and the first sending unit 503 in the apparatus 500 for controlling mounting of a file system may be respectively referred to the related descriptions of step 201, step 202, and step 203 in the corresponding embodiment of FIG. 2, and detailed description thereof will be omitted.

In some alternative implementations of the present embodiment, the determining unit 502 may include: a first generation module (not shown in the figure), a first determining module (not shown in the figure), and a second determining module (not shown in the figure). The first generation module may be configured to generate first mount point information based on the first network attribute information. The first determining module may be configured to determine whether verification information in a verification information set matches the first mount point information. The second determining module may be configured to determine, in response to determining the verification information in the verification information set matching the first mount point information, that the target client has permission to mount to the target file system.

In some alternative implementations of the present embodiment, the apparatus 500 for controlling mounting of a file system may further include: an acquisition unit (not shown in the figure), a first generation unit (not shown in the figure), a second generation unit (not shown in the figure), a storing unit (not shown in the figure) and a second sending unit (not shown in the figure). The acquisition unit may be configured to acquire, in response to receiving a file system application request sent by a client, network attribute information of the client as second network attribute information. The first generation unit may be configured to generate, based on the second network attribute information, second mount point information and an identification of a file system corresponding to the second mount point information. The second generation unit may be configured to generate verification information based on the second network attribute information, the second mount point information, and the identification of the file system corresponding to the second mount point information. The storing unit may be configured to store the verification information into the verification information set. The second sending unit may be configured to send the second mount point information and the identification of the file system corresponding to the second mount point information to the client.

In some alternative implementations of the present embodiment, the first network attribute information may include an authentication string after encryption; and the determining unit may include: a second generation module (not shown in the figure) and a third determining module (not shown in the figure). The second generation module may be configured to generate a verification string using a decryption algorithm corresponding to the encryption. The third determining module may be configured to determine, in response to determining that the verification string matches the authentication string, that the target client has permission to mount to the target file system.

In some alternative implementations of the present embodiment, the apparatus further includes a third sending unit (not shown in the figure). The third sending unit may be configured to send, in response to determining that the target client does not have permission to mount to the target file system, error prompt information to the target server.

The apparatus for controlling mounting of a file system provided by some embodiments of the present disclosure, first, the first receiving unit receives network attribute information of a target client sent by a target server as first network attribute information; then the determining unit determines, based on the first network attribute information, whether the target client has permission to mount to a target file system; and the first sending unit sends, in response to determining that the target client has permission to mount to the target file system, an identification of the target file system to the target server. This embodiment implements the control on whether the target client is allowed to be mounted to the target file system by using the received network attribute information of the target client.

Figure 6:
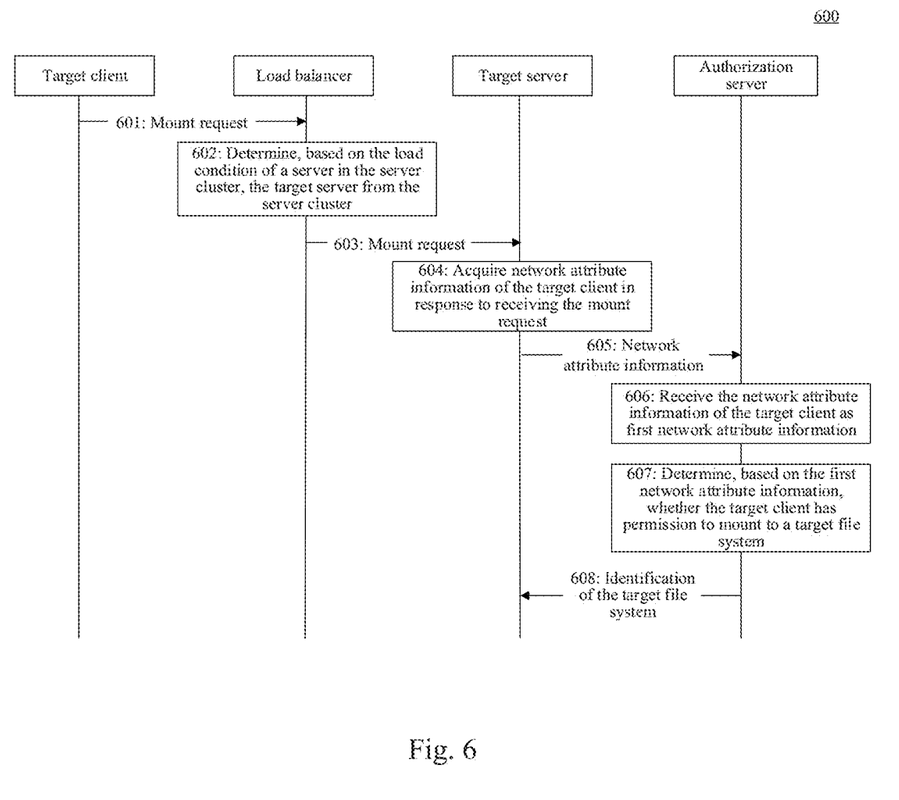
FIG. 6 is a timing diagram of interaction between various devices in a system for controlling mounting of a file system according to an embodiment of the present disclosure.

With further reference to FIG. 6, a timing 600 of interaction between various devices in an embodiment of a system for controlling mounting of a file system is shown. The system for controlling mounting of a file system may include: a load balancer (for example, the load balancer 106 shown in FIG. 1), a target server (for example, the server 1072 in the server cluster 107 shown in FIG. 1) and an authorization server (for example, the server 105 shown in FIG. 1). The load balancer may be configured to receive amount request sent by a target client; determine, based on a load condition of a server in a server cluster, a target server from the server cluster; and send the mount request to the target server. The target server may be configured to acquire network attribute information of the target client in response to receiving the mount request; and send the network attribute information of the target client to an authorization server. The authorization server may be configured to receive the network attribute information of the target client as first network attribute information; determine, based on the first network attribute information, whether the target client has permission to mount to a target file system; and send, in response to determining that the target client has permission to mount to the target file system, an identification of the target file system to the target server.

As shown in FIG. 6, in step 601, the load balancer receives the mount request sent by the target client.

In the present embodiment, the load balancer may receive the mount request sent by the target client (for example, the terminal device 101 shown in FIG. 1) through a wired or wireless connection. The mount request may include mount point information and information of the target file system. It should be noted that the descriptions of the target client and the target file system are consistent with the descriptions in step 202 in the foregoing embodiment, and detailed description thereof will be omitted.

In some alternative implementations of the present embodiment, before step 601, the following steps may also be included.

In the first step, the authorization server acquires, in response to receiving a file system application request sent by a client, network attribute information of the client as second network attribute information.

In the second step, the authorization server generates, based on the second network attribute information, second mount point information and an identification of a file system corresponding to the second mount point information.

In the third step, the authorization server generates verification information based on the second network attribute information, the second mount point information, and the identification of the file system corresponding to the second mount point information.

In the fourth step, the authorization server stores the verification information into a verification information set.

In the fifth step, the authorization server sends the second mount point information and the identification of the file system corresponding to the second mount point information to the client.

It should be noted that the first step to the fifth step are respectively consistent with the steps 401 to 405 in the foregoing embodiment, and the descriptions of the steps 401 to 405 are also applicable to the first step to the fifth step, and detailed description thereof will be omitted.

In step 602, the load balancer determines, based on the load condition of a server in the server cluster, the target server from the server cluster.

In the present embodiment, the load balancer may first read information included in the mount request sent by the target client. The target server may then be determined from the server cluster using various load balancing algorithms. The load balancing algorithm may include, but is not limited to, at least one of: a random algorithm, a weight random algorithm, a round Robin algorithm, a weighted round Robin algorithm, a least connections algorithm, a weighted least connection algorithm, a hash algorithm, an IP address hashing algorithm, or a URL (Uniform Resource Locator) hashing algorithm. The target server may be a server determined using the above load balancing algorithms. As an example, the target server may be the least loaded server in the server cluster. As another example, the target server may also be the server with the lightest overall load obtained by the load balancer performing weight conversion based on the indicators such as the CPU (Central Processing Unit) model, the number of CPUs, the size of the memory, and the number of current connections of the servers in the server cluster. It should be noted that the load balancing algorithms are well-known technologies that are widely studied and applied at present, a suitable algorithm may be selected according to the actual application scenario, and detailed description thereof will be omitted.

In step 603, the load balancer sends the mount request to the target server.

In the present embodiment, the load balancer may forward the mount request sent by the target client to the target server determined in step 602.

In step 604, the target server acquires network attribute information of the target client in response to receiving the mount request.

In the present embodiment, the target server determined in step 602 may receive the mount request sent by the target client forwarded by the load balancer in step 603. Then, the target server may acquire the network attribute information of the target client in various methods. The description of the network attribute information is the same as the description in step 201 in the foregoing embodiment, and detailed description thereof will be omitted. As an example, the target server may acquire the network attribute information from the mount request sent by the target client. As another example, the target server may further acquire the network attribute information from a server that provides support for the VPC where the target client is located.

In step 605, the target server sends the network attribute information of the target client to an authorization server.

In the present embodiment, the target server may send the network attribute information of the target client acquired from step 604 to the authorization server through a wired or wireless connection.

In step 606, the authorization server receives the network attribute information of the target client as first network attribute information.

In step 607, the authorization server determines, based on the first network attribute information, whether the target client has permission to mount to a target file system.

In step 608, the authorization server sends, in response to determining that the target client has permission to mount to the target file system, an identification of the target file system to the target server.

In some alternative implementations of the present embodiment, the target server may send information indicating a successful mount to the target client, in response to receiving the identification of the target file system.

It should be noted that the steps 606, 607, and 608 are consistent with the steps 201, 202, and 203 in the foregoing embodiment, and the descriptions of the steps 201, 202, and 203 are also applicable to the step 606, step 607 and step 608, and detailed description thereof will be omitted.

In some alternative implementations of the present embodiment, the timing further includes the following steps.

In the first step, the load balancer performs survival detection on a server in the server cluster, in response to receiving a reconnection request sent by the target client, to obtain a survival detection result.

In these implementations, the target client may send the reconnection request to the load balancer, if the target server currently accessing the target file system fails and restarts or the network used to connect the target server and the target client fails. In practice, the reconnection request may be automatically initiated by the NFS of the target client when detecting a network connection failure. The load balancer may perform the survival detection on the server in the server cluster in response to receiving the reconnection request. The survival detection on the server may be to identify whether the server is available (online) through information such as the open port, service and server name, or server operating system of the server under test. The above method for performing survival detection on the server may include, but is not limited to, host scanning, port scanning, operating system/network service identification, vulnerability scanning, or the like. The host scanning may include, but is not limited to, at least one of: a Ping (a DOS command) scanning using ICMP (Internet Control Message Protocol), a host scanning using TCP (Transmission Control Protocol), or a host scanning using UDP (User Datagram Protocol). By performing the survival detection on the server, the load balancer may obtain the survival detection result of whether each server in the server cluster is available.

In the second step, the load balancer determines a new target server from the server cluster based on the survival detection result.

In these implementations, the load balancer determines the new target server from the available servers in the server cluster based on the survival detection result obtained in the first step and the load balancing algorithm in the foregoing step 602.

In the third step, the load balancer forwards the mount request to the new target server.

In these implementations, the load balancer forwards the mount request sent by the target client to the new target server determined in the second step. Then, the new target server takes over the original target server, and continues to provide the target client with the service of mounting to the target file system.

In the system for controlling mounting of a file system provided by some embodiments of the present disclosure, first, the load balancer receives an amount request sent by a target client; then the load balancer determines, based on a load condition of a server in a server cluster, a target server from the server cluster; and next the load balancer sends the mount request to the target server; then the target server acquires network attribute information of the target client in response to receiving the mount request, and the target server sends the network attribute information of the target client to an authorization server; and the authorization server receives the network attribute information of the target client as first network attribute information; the authorization server determines, based on the first network attribute information, whether the target client has permission to mount to a target file system; and the authorization server sends, in response to determining that the target client has permission to mount to the target file system, an identification of the target file system to the target server. Alternatively, in the case that the target server cannot continue to provide services due to its own or network failure, the load balancer may also perform survival detection on a server in the server cluster, and then forward the mount request to the new target server to continue to provide the mount service of the target file system to the target client. Thereby, not only the control on whether the target client is allowed to be mounted to the target file system through the target server is implemented by using the received first network attribute information, but also the new server is switched to continue to provide the access service to the target file system when the accessed server fails.

Figure 7:
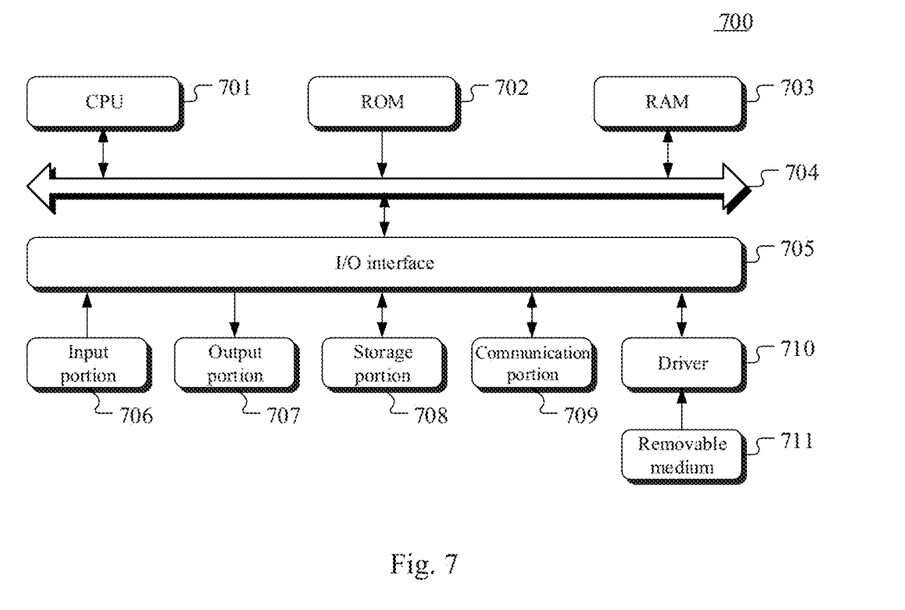
FIG. 7 is a schematic structural diagram of a computer system adapted to implement a server of some embodiments of the present disclosure.

With further reference to FIG. 7, a schematic structural diagram of a computer system 700 adapted to implement a server of some embodiments of the present disclosure is shown. The server shown in FIG. 7 is merely an example, and should not impose any limitation on the function and scope of use of some embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components may be connected to the I/O interface 705: an input portion 706 including such as a keyboard, a mouse; an output portion 707 including such as a liquid crystal display device (LCD), etc.; a storage portion 708 including a hard disk or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In the some embodiments of present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in some embodiments of the present disclosure may be implemented by means of software or hardware. The described units may also be provided in a processor, for example, may be described as: a processor including a first receiving unit, a determining unit, and a first sending unit. Here, the names of these units do not in some cases constitute limitations to such units themselves. For example, the first receiving unit may also be described as "a unit configured to receive network attribute information of a target client sent by a target server as first network attribute information".

In another aspect, some embodiments of the present disclosure further provide a computer readable medium. The computer readable medium may be included in the server in the above described embodiments, or a stand-alone computer readable medium not assembled into the server. The computer readable medium carries one or more programs. The one or more programs, when executed by the server, cause the server to: receive network attribute information of a target client sent by a target server as first network attribute information; determine, based on the first network attribute information, whether the target client has permission to mount to a target file system; and send, in response to determining that the target client has permission to mount to the target file system, an identification of the target file system to the target server.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for controlling mounting of a file system, the method comprising:
   acquiring, in response to receiving a file system application request sent by a client, network attribute information of the client as second network attribute information;
   generating, based on the second network attribute information, second mount point information and an identification of a file system corresponding to the second mount point information;
   generating verification information based on the second network attribute information, the second mount point information, and the identification of the file system corresponding to the second mount point information;
   storing the verification information into a verification information set;
   sending the second mount point information and the identification of the file system corresponding to the second mount point information to the client;
   receiving first network attribute information of a target client sent by a target server;
   generating first mount point information based on the first network attribute information according to the same way as generating the second mount point information based on the second network attribute information;
   determining whether verification information in the verification information set matches the first mount point information;
   determining, in response to determining the verification information in the verification information set matching the first mount point information, that the target client has permission to mount to a target file system; and
   sending, in response to determining that the target client has permission to mount to the target file system, an identification of the target file system to the target server.

2. The method according to claim 1, wherein the first network attribute information comprises an authentication string after encryption of the first network attribute information, and wherein determining, based on the first network attribute information, whether the target client has permission to mount to the target file system, comprises:
   generating a verification string using a decryption algorithm corresponding to the encryption; and
   determining, in response to determining that the verification string matches the authentication string, that the target client has permission to mount to the target file system.

3. The method according to claim 1, wherein the method further comprises:
   sending, in response to determining that the target client does not have permission to mount to the target file system, error prompt information to the target server.

4. A non-transitory computer readable medium, storing a computer program thereon, the computer program, when executed by a processor, causes the processor to implement the method according to claim 1.

5. An apparatus for controlling mounting of a file system, the apparatus comprising:
   at least one processor; and
   a memory storing instructions, the instructions when executed by the at least one processor, cause the at least one processor to perform operations, the operations comprising:
      acquiring, in response to receiving a file system application request sent by a client, network attribute information of the client as second network attribute information;
      generating, based on the second network attribute information, second mount point information and an identification of a file system corresponding to the second mount point information;
      generating verification information based on the second network attribute information, the second mount point information, and the identification of the file system corresponding to the second mount point information;
      storing the verification information into a verification information set;
      sending the second mount point information and the identification of the file system corresponding to the second mount point information to the client;
      receiving first network attribute information of a target client sent by a target server;
      generating first mount point information based on the first network attribute information according to the same way as generating the second mount point information based on the second network attribute information;
      determining whether verification information in the verification information set matches the first mount point information;
      determining, in response to determining the verification information in the verification information set matching the first mount point information, that the target client has permission to mount to a target file system; and
      sending, in response to determining that the target client has permission to mount to the target file system, an identification of the target file system to the target server.

6. The apparatus according to claim 5, wherein the first network attribute information comprises an authentication string after encryption of the first network attribute information, and wherein determining, based on the first network attribute information, whether the target client has permission to mount to the target file system, comprises:
generating a verification string using a decryption algorithm corresponding to the encryption; and
determining, in response to determining that the verification string matches the authentication string, that the target client has permission to mount to the target file system.

7. The apparatus according to claim 5, wherein the operations further comprise:
sending, in response to determining that the target client does not have permission to mount to the target file system, error prompt information to the target server.

8. A system for controlling mounting of a file system, the system comprising:
a load balancer having one or more processors configured to:
receive a mount request sent by a target client;
determine, based on a load condition of one or more servers in a server cluster, a target server from the server cluster; and
send the mount request to the target server;
the target server having one or more processors configured to:
acquire first network attribute information of the target client in response to receiving the mount request; and
send the first network attribute information of the target client to an authorization server; and
the authorization server having one or more processors configured to:
acquire, in response to receiving a file system application request sent by a client, network attribute information of the client as second network attribute information;
generate, based on the second network attribute information, second mount point information and an identification of a file system corresponding to the second mount point information;
generate verification information based on the second network attribute information, the second mount point information, and the identification of the file system corresponding to the second mount point information;
store the verification information into a verification information set;
send the second mount point information and the identification of the file system corresponding to the second mount point information to the client;
receive the first network attribute information of the target client;
generate first mount point information based on the first network attribute information according to the same way as generating the second mount point information based on the second network attribute information;
determine whether verification information in the verification information set matches the first mount point information;
determine, in response to determining the verification information in the verification information set matching the first mount point information, that the target client has permission to mount to a target file system; and
send, in response to determining that the target client has permission to mount to the target file system, an identification of the target file system to the target server.

9. The system according to claim 8, wherein the target server is further configured to:
send information indicating a successful mount to the target client, in response to receiving the identification of the target file system.

10. The system according to claim 8, wherein the load balancer is further configured to:
perform survival detection on the one or more servers in the server cluster, in response to receiving a reconnection request sent by the target client, to obtain a survival detection result;
determine a new target server from the server cluster based on the survival detection result; and
forward the mount request to the new target server.

* * * * *